US006404915B1

United States Patent
Yung et al.

(10) Patent No.: US 6,404,915 B1
(45) Date of Patent: Jun. 11, 2002

(54) IMAGE ACQUIRING APPARATUS

(75) Inventors: Benjamin Yung, Cupertion; Michael Truog, Sunnyvale; Simon Goble, Palo Alto; Vipin Ahuja, Mountain View, all of CA (US)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/119,876

(22) Filed: Jul. 21, 1998

(51) Int. Cl.[7] .................................................. G06K 9/00
(52) U.S. Cl. ........................................ 382/162; 382/232
(58) Field of Search ................................. 382/250, 232, 382/236, 248; 348/403; 358/453

(56) References Cited

U.S. PATENT DOCUMENTS 5,260,888 A * 11/1993 Sharman ................ 364/724.05
5,684,536 A * 11/1997 Sugiyama ................... 348/403

FOREIGN PATENT DOCUMENTS

JP  11-154197  * 6/1999

* cited by examiner

Primary Examiner—Jerome Grant, II
(74) Attorney, Agent, or Firm—Knobbe, Martens, Olson & Bear, LLP.

(57) ABSTRACT

An image acquiring apparatus for automatically selecting from 1D image signal and a 2D image signal is disclosed. The apparatus includes an image signal acquisition device selectably acquiring therethtrough the 1D image signal and the 2D image signal, an image acquisition control controlling the image signal acquisition device to selectably acquire one of the 1D image signal and the 2D image signal, a memory for storage, a pixel processing unit for processing one of the 1D image signal and the 2D image signal, an input/output interface, and a selecting mechanism for passing one of the 1D image signal and the 2D image signal through the pixel processing unit.

49 Claims, 16 Drawing Sheets

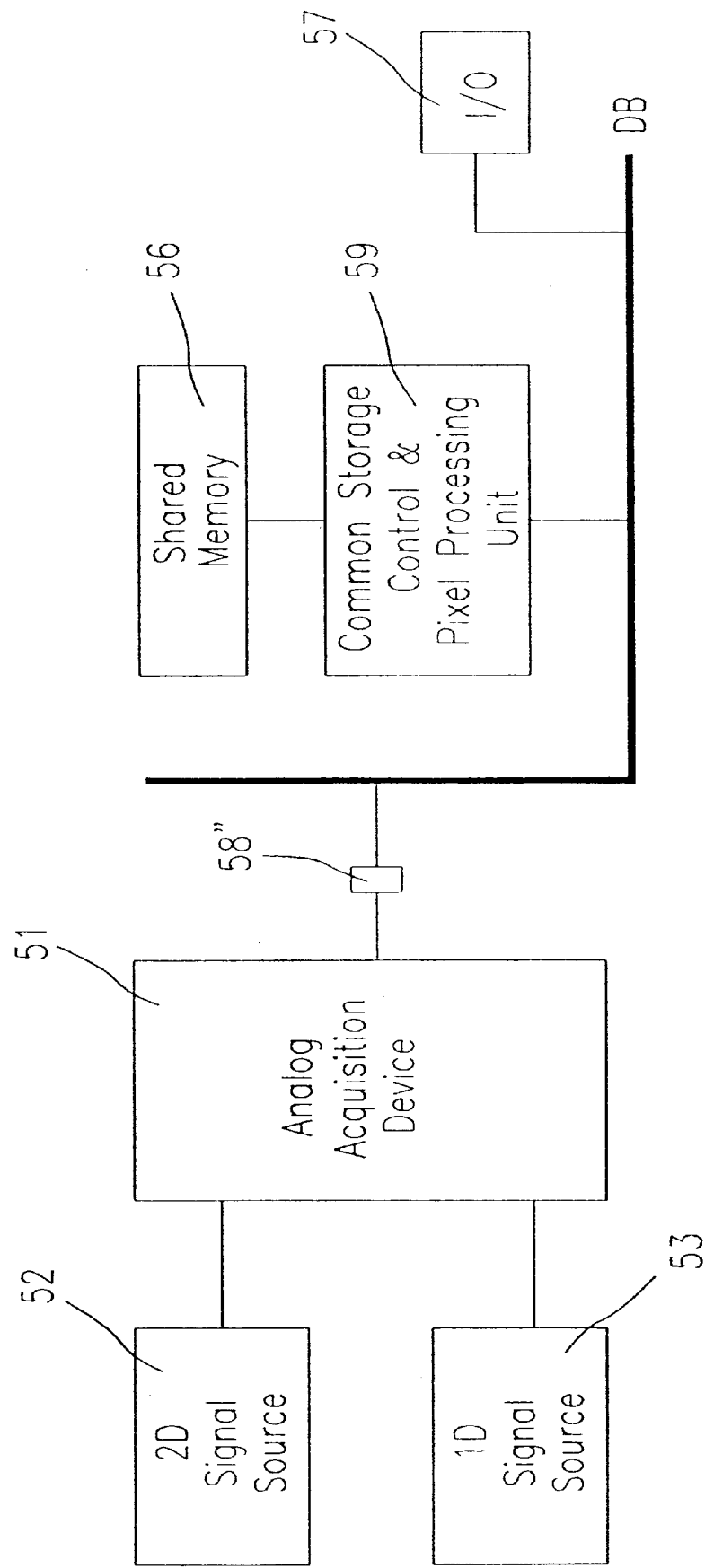

IMAGE ACQUIRING APPARATUS

FIELD OF THE INVENTION

The present invention relates to an image apparatus, and more particularly to an image acquiring apparatus.

BACKGROUND OF THE INVENTION

Image input devices have become a common tool for input of pictures in the real world into a computing environment. These input devices have historically captured the picture by either capturing the image as a one dimensional signal (such as the signal from an image sensor with a linear structure) or as a two-dimensional signal (such as the sigal of video of interlaced or non-interlaced types or other instantaneous capture apparatus).

Most computing devices and computers, particularly personal computers, have limited external I/O ports for connecting thereto peripheral devices. A typical PC contains maybe a single parallel interface port and two serial ports, or two serial bus ports. This usually results in port conflicts that requires cable swapping operations and often system software configuration changes. The parallel interface port is usually connected to (1) a printing device, (2) an external storage device for backup or high density transmission, (3) a scanner image input devices, and increasingly (4) other image acquisition devices such as video capture devices.

In addition to physical port limitation, the software set up in Windows (Mcrosoft Trademark)-based system supporting image acquisition devices is still in developmental stages, with existing standards co-existing with emerging standards (e.g. TWAIN, Still-Image-Architecture, Video-for-Windows, and Imaging-classes . . . etc. wherein TWAIN stands for Technology Without An Interesting Name and is an industry standard, and we can find its details at url:http://www.twain.org). This usually results in device operational conflicts, increased cost as devices have to support port switching circuits, and frequently system crashes. It also requires complex system cabling and switching as illustrated in FIG. 1, which shows a first switch 1 connected to a personal computer 2 for switching between an image scanner 3 and a video capturer 4, and a second switch 5 connected to image scanner 3 for switching between a printer 6 and an external storage 7.

When one examines the general. architecture of a one dimensional image acquisition device such as a scanner, one finds a structure that is shown in FIG. 2 which represents the majority of scanner architectures on the market today and includes a linear signal source 11, an analog-to-digital converter 12, a control, storage interface and digital processing unit 13, a timing control unit 14, a storage or memory unit 15 and an input/output unit 16.

Two dimensional image acquisition has two major types of sources: video from consumer and professional video devices and digital cameras. There exists on the market a number of video capture devices for capturing 2-D images in the PC environment. They have one of two general architect as outlined in FIG. 3 which shows a digital camera 21 as the first architecture, and the combination of a video capture device 22, an A/D converter 23, a video timing & frame grab control unit 24, a storage unit 25 and an input/output unit 26 as the second architecture.

There exists also multi-function devices such as the scanner-fax-copier-printer combination. FIG. 4 shows how they are implemented by using common the I/O structure. In general, they have a singular image acquisition function. In FIG. 4, there is shown a multi-function peripheral hardware architecture including a personal computer 31, a first switch 32, a print mechanism 33, a print controller 34, a second switch 35, a scanning mechanism 36, a scanning controller 37, facsimile electronics 38 and a POTS (Plain Old Telephone Service) line 39. In such configuration, the positions of first and second switches 32, 35 will determine the operation mode which can be tabulated as follows:

| Switch Positions | Mode |
| --- | --- |
| A–C | Illegal |
| A–D | Printer |
| B–C | Fax Output or Copier |
| B–D | Print Fax Input |

Other than sharing I/O switches, the above combination, however, exists little synergy between relevant functional blocks.

Till now, as shown in FIG. 5, any one who wants to simultaneously or optionally acquire 1D images and 2D images, he or she must equip himself or herself with two independent hardware units and two independent software programs which include for 1D image acquisition, a hardware unit 41, a driver software 42, an operating system component (e.g. TWAIN) 43 and an application software 44, and for 2D image acquisition, a hardware 45, a driver software 46, an operating system component (e.g. Video for Windows (VFW) or Still-Image-Architecture (SIA)) 47 and an application software 48.

It is therefore tried by the Applicant to deal with the above situations encountered in the prior art.

SUMMARY OF THE INVENTION

It is therefore an object of the present invention to provide an image acquiring apparatus for selectably acquiring 1D image signal and 2D image signal.

It is further an object of the present invention to provide a single image acquiring apparatus having a simplified structure for selectably acquiring a 1D image signal and a 2D image signal.

It is additional an object of the present invention to provide a convenient image acquiring apparatus allowing the user to selectably acquire 1D image signal and 2D image signal.

According to an aspect of the present invention, an image acquiring apparatus includes an image signal acquisition device selectably acquiring therethtrough a 1D image signal and a 2D image signal, an image acquisition control directly or indirectly electrically connected to and controlling the image signal acquisition device to selectably acquire one of the 1D signal and the 2D signal, a memory directly or indirectly electrically connected to the image acquisition control for storage, a pixel processing unit directly or indirectly electrically connected to the image acquisition control for processing one of the 1D image signal and the 2D image signal, an input/output interface directly or indirectly electrically connected to the image acquisition control, and a selecting mechanism directly or indirectly electrically connected to the signal acquisition device for passing one of the 1D image signal and the 2D image signal through the pixel processing unit.

Certainly, the ire acquisition device can include a 1D analog acquisition unit for acquiring theretrough the 1D image signal, and a 2D analog acquisition unit for acquiring therethrough the 2D image signal. The 1D analog acquisition unit and the 2D analog acquisition unit can respectively be a 1D image sensor and a 2D image sensor.

Alternatively, the present image acquisition device can include a 1D image digitizer for acquiring therethrough the 1D image signal, and a 2D digital demodulating device for acquiring therethrough the 2D image signal. The 2D digital demodulating device can include a 2D sensor, an analog-to-digital converter and a digital demodulator.

As further an alternative, the present image acquisition device can include a 1D image means for acquiring therethrough the 1D image signal, and a 2D image means for acquiring therethtrough the 2D image signal. Each of said 1D image means and 2D image means can include an image sensing device and a signal digitizer. The signal digitizer can be an analog-to-digital converter. Alternatively, each of the 1D image means and the 2D image me=can be an image sensor. The image sensor can incorporate therein an image digitizer The image digitizer can be an analog-to-digital converter.

Certainly, the selecting mechanism can be electrically connected to the pixel processing unit As an example, the selecting mechanism can be selecting switch controlled by a software built in the pixel processing unit. Alternatively, the selecting mechanism can be a multiplexer.

Alternatively, the selecting mechanism can be built in the image acquisition device for discriminating the 1D image signal from from the 2D image signal. As a further example, the selecting mechanism can be electrically connected between the image acquisition device and the pixel processing unit.

Certainly, the selecting mechanism can include an analog demodulating circuit and a multiplexer. The pixel processing unit can be embedded into the image acquisition control.

Certainty, the present apparatus cm further include another pixel processing unit so that the pixel processing units will respectively process the 1D image signal and the 2D image signal. In such circumstance, the present apparatus can Her include another selecting mechanism so that the two selecting mechanisms can be interactive such that only one of the 1D image signal and the 2D image signal will pass through a respective one of the pixel processing units at a time.

As a further embodiment, the present apparatus further includes at least another pixel processing unit for serially processing one of the 1D image signal and the 2D image signal.

In an embodiment of the present apparatus, the present image acquisition device includes an analog-to-digital converter for digitalizing one of the 1D image signal and the 2D image signal.

Alternatively, the image acquisition device can include two analog-to-digital converters for respectively digitalizing the 1D image signal and the 2D image signal.

Preferably he pixel processing unit further includes a common color pipeline module for performing color balance calibration to generate a specific image file format. The common color pipeline module includes a null operation. The common color pipeline module performs at least one function selected from a group consisting of signal linearization, gamma correction, color-space transformation, color balancing and matching processing.

Generally, the present apparatus further includes a computing device electrically connected to the input/output interface and provided with a common color pipeline module for performing color balance calibration to generate a specific image file format wherein the common color pipeline module includes a null operation, and the common color pipeline module performs at least one function selected from a group consisting of signal linearization, gamma correction, color-space transformation, color balancing and matching processing.

Alternatively, the present image acquiring apparatus includes an image signal acquisition device selectably acquiring therethrough a 1D image signal and a 2D image signal, a pixel processing unit directly or indirectly electrically connected to the image signal acquisition device for processing one of the 1D image signal and the 2D image signal, an image acquisition control directly or indirectly electrically connected to and controlling the pixel processing unit to selectably process one of the 1D image signal and the 2D image signal, a memory directly or indirectly electrically connected to the image acquisition control for storage, an input/output interface directly or indirectly electrically connected to the image acquisition control, and a selecting mechanism directly or indirectly electrically connected to said image signal acquisition device for passing one of the 1D image signal and the 2D image signal trough the pixel processing unit.

In this embodiment, the diversifications mentioned in the previous embodiment can also be exercised. For example, the image acquisition device can include a 1D analog acquisition unit for acquiring therethrough the 1D image signal, and a 2D analog acquisition unit for acquiring theretrough the 2D image signal.

Alternatively, the image acquisition device can include a 1D image digitizer for acquiring theretrough the 1D image signal, and a 2D digital demodulating device for acquiring therethrough the 2D image signal.

As a further example, the image acquisition device includes a 1D image means for acquiring theretrough the 1D image signal, and a 2D image means for acquiring therethrough the 2D image signal. Each of the 1D image means and 2D image means can include an image sensing device and a signal digitizer. Alternatively, each of the 1D image means and 2D image means can be an image sensor.

Metaphysically speaking, the present image acquiring apparats includes a hardware structure for acquiring theretrough one of a 1D image signal and a 2D image signal, and a singular driver module enabling the, hardware structure to selectably acquire therethrough the one image signal.

The hardware structure can include an image signal acquisition device selectably acquiring therethrough a 1D image signal and a 2D image signal, a pixel processing unit directly or indirectly electrically connected to the image signal acquisition device for processing one of the 1D image signal and the 2D image signal, an image acquisition control directly or indirectly electrically connected to and controlling the pixel processing unit to selectably process one of the 1D image signal and the 2D image signal, a memory directly or indirectly electrically connected to the image acquisition control for storage, an input/output interface directly or indirectly electrically connected to the image acquisition control, and a selecting mechanism directly or indirectly electrically connected to the image signal acquisition device for passing one of the 1D image signal and the 2D image signal through the pixel processing unit.

Certainly, the selecting mechanism can be embedded into the driver module. The hardware structure can include an image signal acquisition device selectably acquiring therethrough a 1D image signal and a 2D image signal, an image acquisition control directly or indirectly electrically connected to and controlling the image signal acquisition device to selectably acquire one of the 1D image signal and the 2D image signal, a memory directly or indirectly electrically connected to the image acquisition control for storage, a pixel processing unit directly or indirectly electrically connected to the image acquisition control for processing one of the 1D image signal and the 2D image signal, an input/output interface directly or indirectly electrically connected to the image acquisition control, and a selecting mechanism directly or indirectly electrically connected to the image signal acquisition device for passing one of the 1D image signal and the 2D image signal through the pixel processing unit.

By the same token, the selecting mechanism can be embedded into the driver module. The driver module can utilize a common application interface definition to transfer data with said hardware sire.

Preferably the present apparatus firer includes an operating system interface means for cooperating with a TWAIN standard interface, a Still-Image-Architecture (Mocrosoft ™) interface and a Video for Windows (Microsoft ™) interface. The operating system interface means can include two operating system interfaces, one of which cooperates with the TWAIN interface and the other of which cooperates with one of the Still-Image-Architecture interface and the Video for Windows interface.

The diversifications described wit respect to the previous examples can also be applicable here. Specifically, the image acquisition device can include a 1D analog acquisition unit for acquiring therethrough the 1D image signal, and a 2D analog acquisition unit for acquiring therethtrough the 2D image signal.

Alternatively, the image acquisition device can include a 1D image digitizer for acquiring therethrough the 1D image signal, and a 2D digital demodulating device for acquiring therethrough the 2D image signal.

As a further example, the image acquisition device can include. a 1D image means for acquiring theretrough the 1D image signal, and a 2D image means for acquiring therethrough the 2D image signal. Each of the 1D image means and 2D image means can include an image sensing device and a signal digitizer. Alternatively, each of the 1D image means and 2D image means can be an image sensor which can incorporate therein a signal digitizer.

The present invention may best be understood through the following descriptions with reference to the accompanying drawings, in which:

BRIEF DESCRIPTION OF THE DRAWINGS

FIG. 6C is a schematical view showing an architecture of a third preferred embodiment of an image acquiring apparatus according to the present invention capable of simultaneously or optionally acquiring image signals from 1D image source and/or 2D image source;

DETAILED DESCRIPTION OF THE PREFERRED EMBODIMENT

Figure 1:
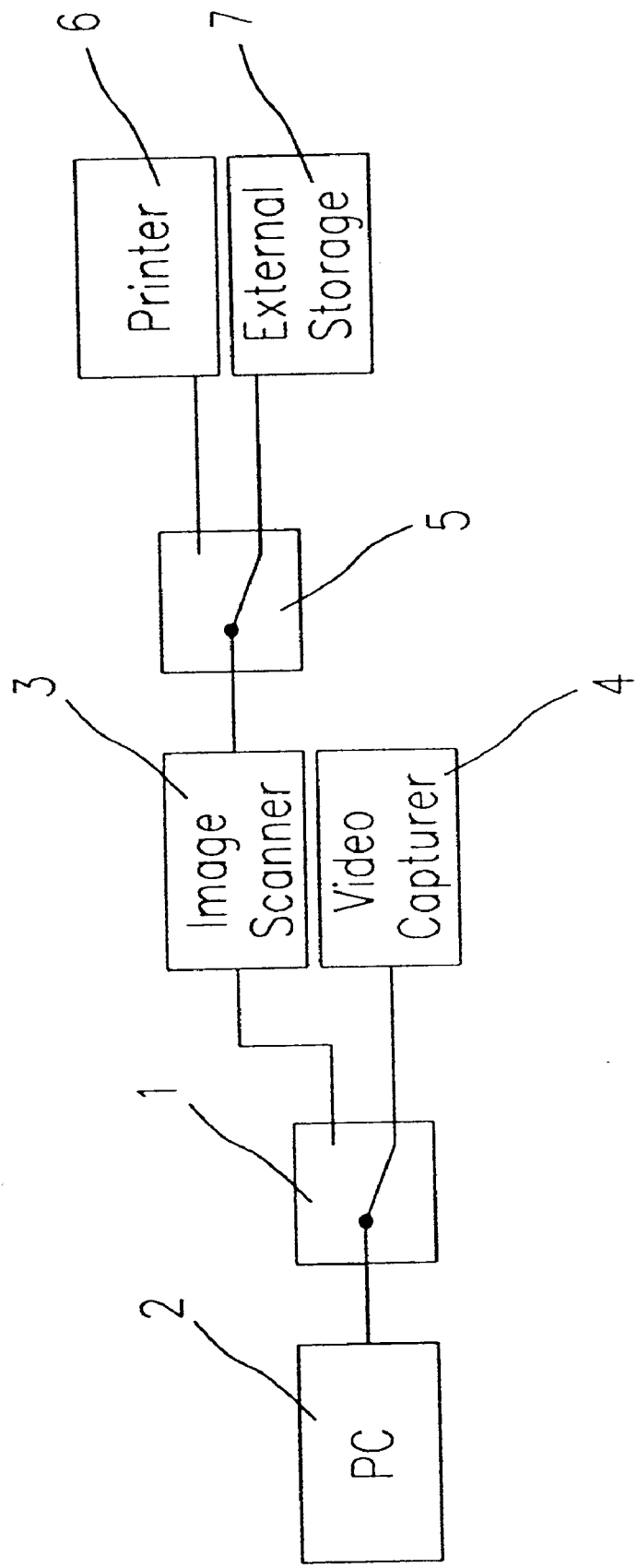
FIG. 1 is a schematical view showing the complex system cabling and switching required in the conventional personal computer if to be connected with 1D image source and 2D image source simultaneously.
Figure 2:
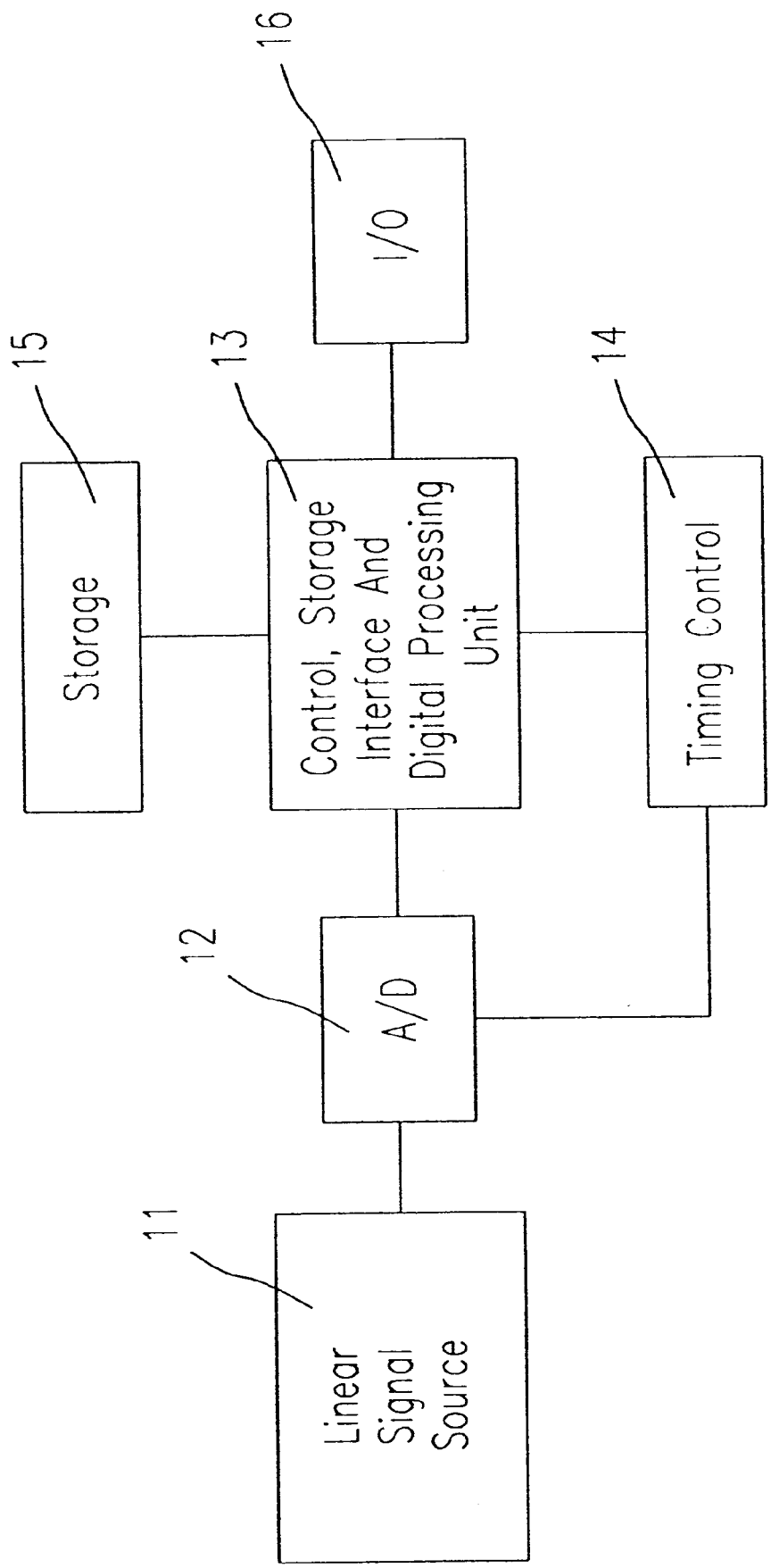
FIG. 2 is a schematical view showing to general architecture of a one-dimensional image acquisition device.
Figure 3:
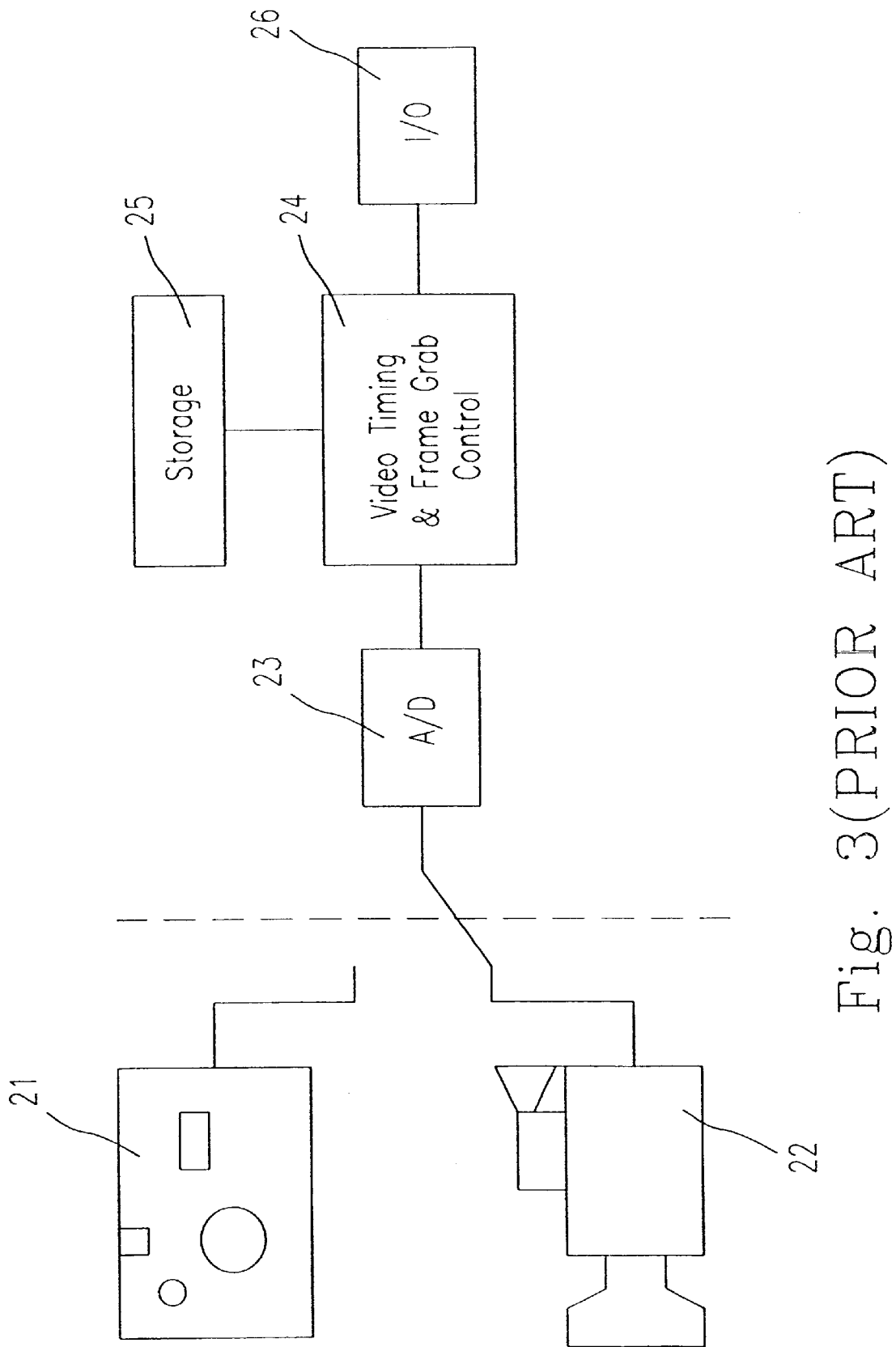
FIG. 3 is a schematical view showing the general architecture of a two-dimensional image acquisition device.
Figure 4:
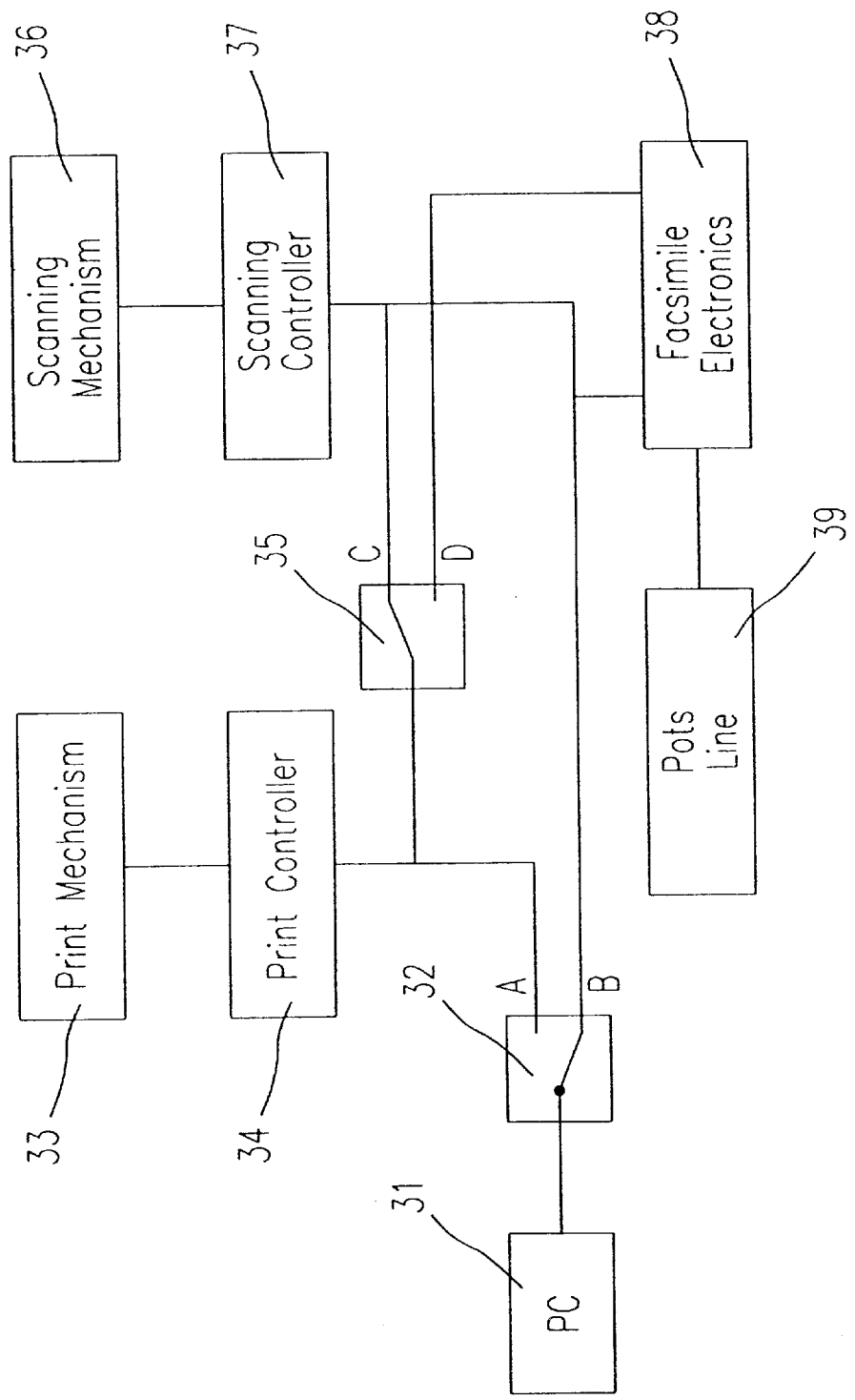
FIG. 4 is a schematical view showing a multi-function peripheral hardware architecture according to the prior art.
Figure 5:
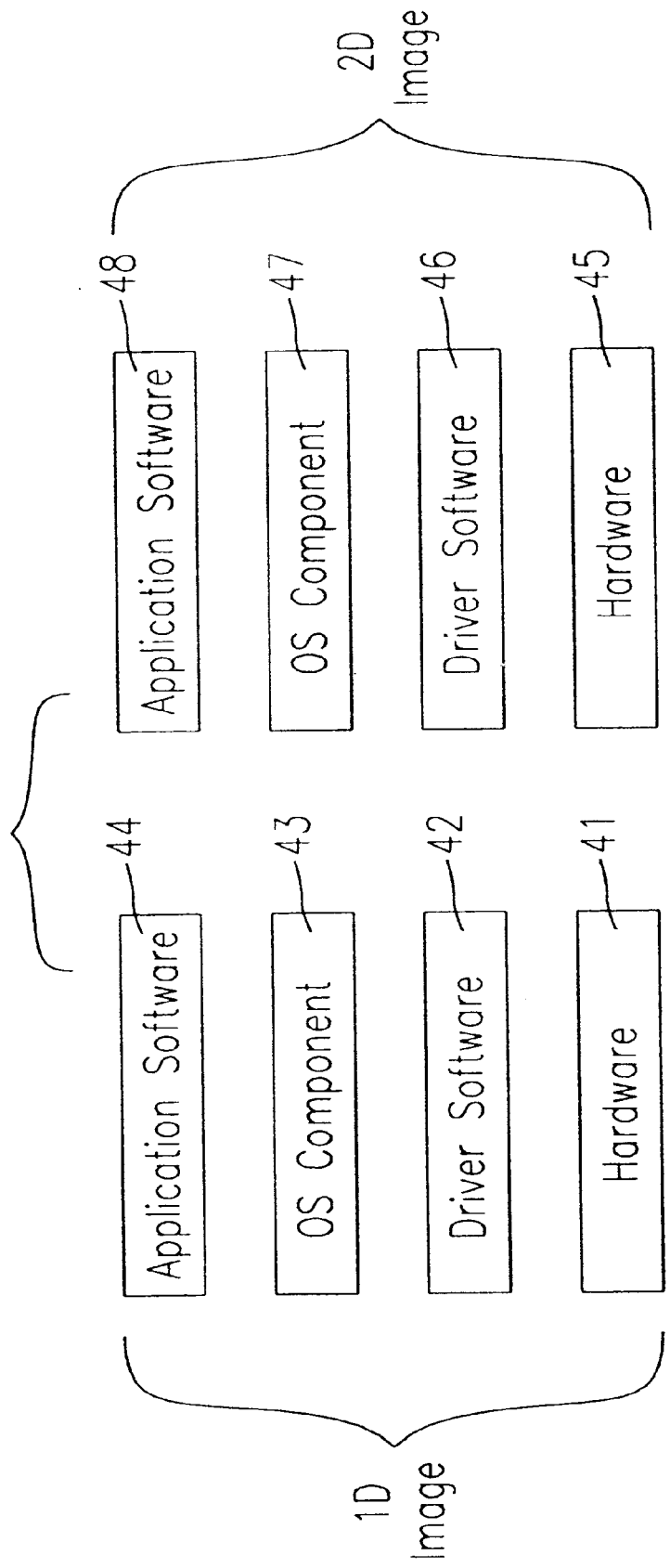
FIG. 5 is a schematical view showing a basic structure according to the prior art if a user wants to utilize simultaneously or optionally 1D image source and 2D image source.
Figure 6A:
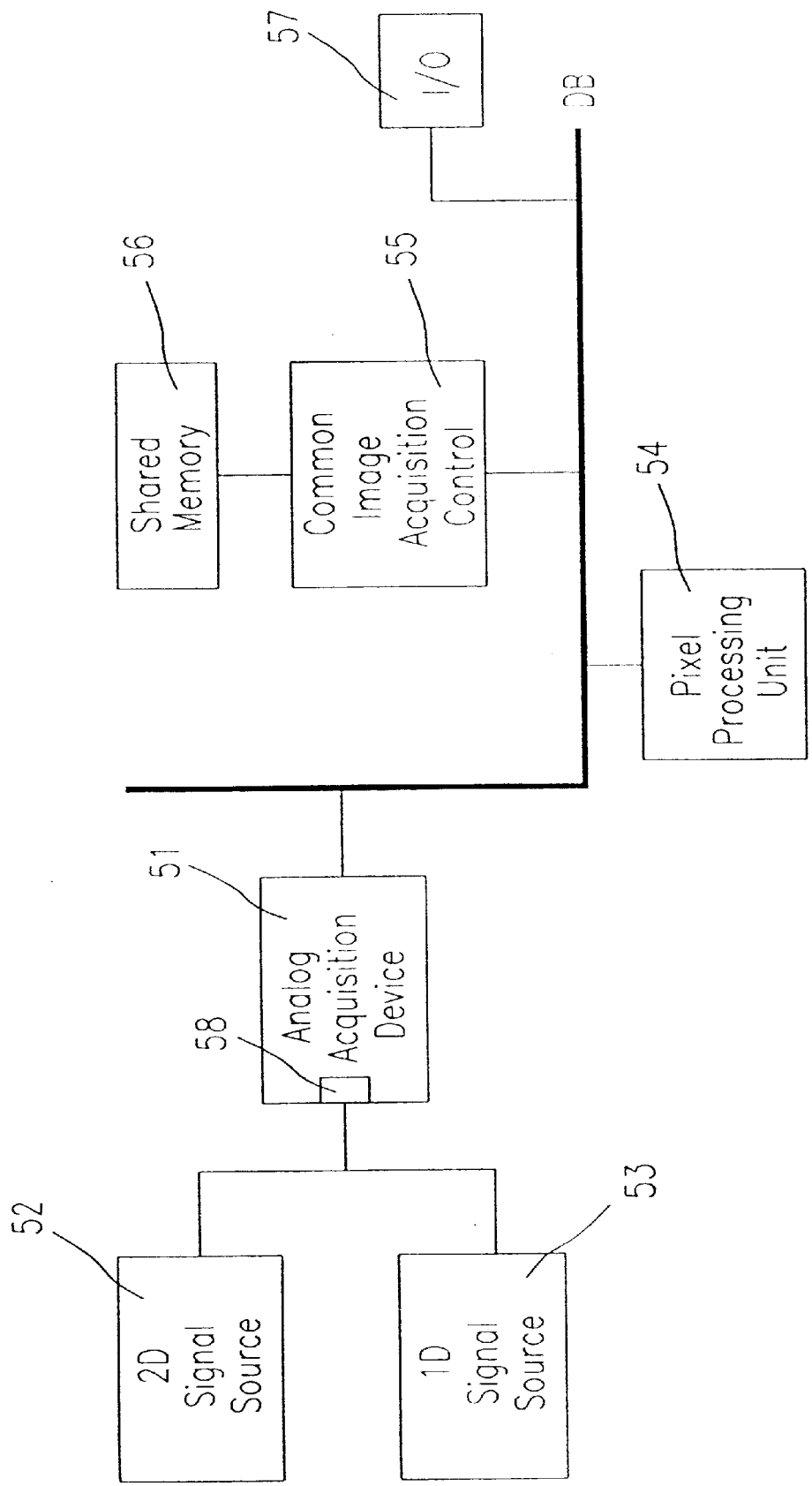
FIG. 6A is a schematical view shown an architecture of a first preferred embodiment of an image acquiring apparatus according to the present invention capable of simultaneously or optionally acquiring image signals from 1D image source and/or 2D image source.

As shown in FIG. 6A, a system hardware architecture for an image acquiring apparatus according to the present invention includes an analog signal acquisition device 51 selectably acquiring therethrough a 1D analog signal from a 1D signal source 53 and a 2D analog signal from a 2D signal source 52, an image acquisition control 55 electrically connected to and controlling analog signal acquisition device 51 to selectably acquire one of the 1D analog signal and the 2D analog signal, a memory or shared storage 56 electrically connected to image acquisition control 55 for storage, a pixel processing unit 54 electrically connected to image acquisition control 55 through a shared internal data bus DB for processing one of the 1D analog signal and the 2D analog signal, an input/output interface 57 electrically connected to image acquisition control 55, and a selecting mechanism 58 electrically connected to analog signal acquisition device 58 for ascertaining and then passing therethrough one of the 1D analog signal and the 2D analog signal. As also shown in FIG. 6B, with a different viewpoint, the present image acquiring apparatus can alternatively include an analog signal acquisition device 51 selectably acquiring therethrough a 1D analog signal from a 1D signal source 53 and a 2D analog signal from a 2D signal source 52, a pixel processing unit 54 electrically connected to analog signal acquisition device 51 for processing one of the 1D analog signal and the 2D analog signal, an image acquisition control 55 electrically connected to and controlling pixel processing unit 54 to selectably process one of the 1D analog signal and the 2D analog signal, a memory 56 electrically connected to image acquisition control 55 for storage, an input/output interface 57 electrically connected to image acquisition control 55, and a selecting mechanism 58' electrically connected to analog signal acquisition device 55 for ascertaining and then passing theretrough one of the 1D analog signal and the 2D analog signal.

Figure 6B:
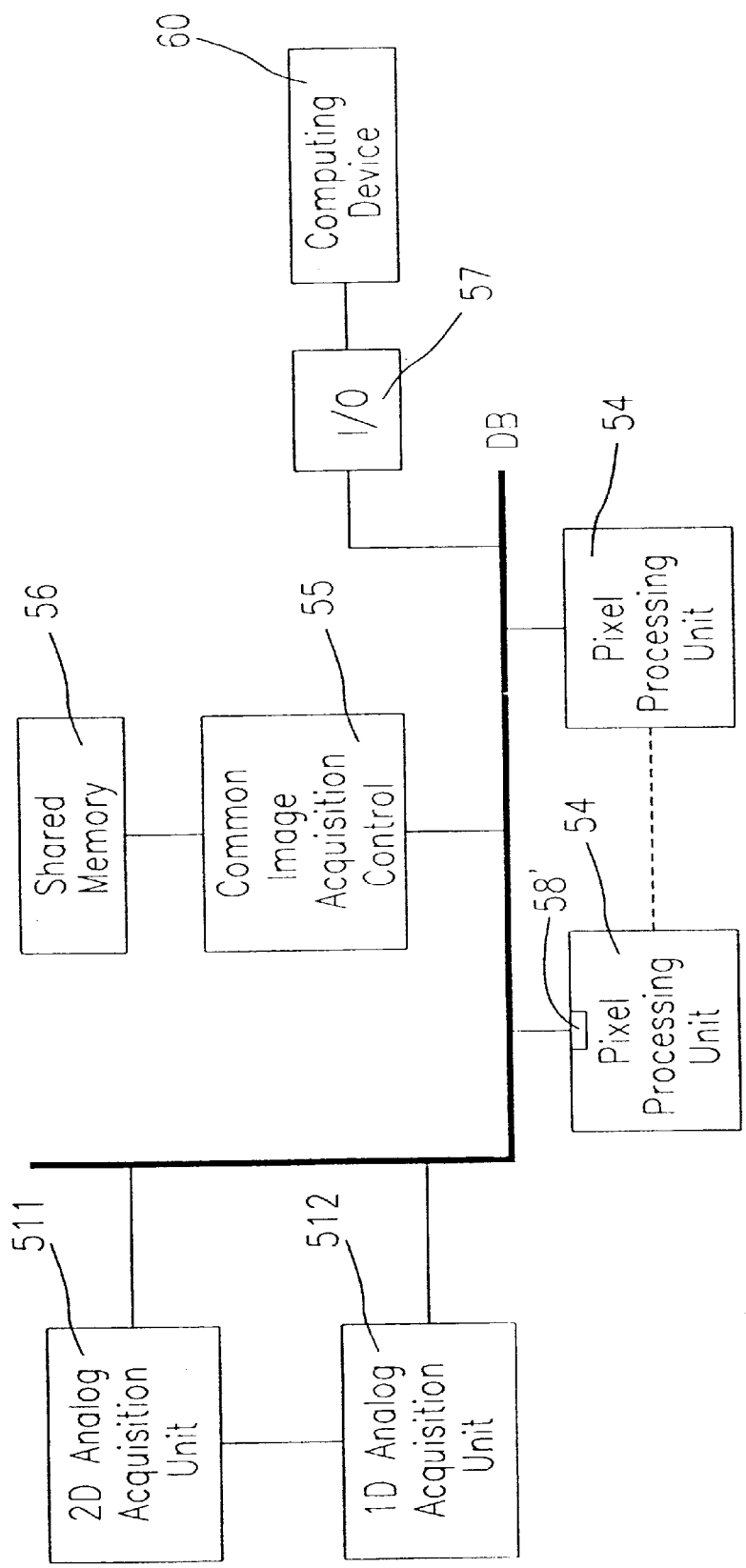
FIG. 6B is a schematical view showing an architecture of a second preferred embodiment of an image acquiring apparatus according to the present invention capable of simultaneously or optionally acquiring image signals from 1D image source and/or 2D image source.

As shown in FIG. 6B, analog acquisition device 51 can further include a 1D analog acquisition unit 512 for acquiring therethrough the 1D analog signal, and a 2D analog acquisition unit 511 for acquiring theretrough the 2D analog signal. FIG. 6B also shows selecting mechanism 58' can alternatively be electrically connected to pixel processing unit 54. As is readily conceivable to those skilled in the art, selecting mechanism 58' can be a control switch controlled by a software built in pixel processing unit 54.

As also is well-known in the art and shown in FIG. 6A, selecting mechanism 58 can be built in analog acquisition device 51 for discriminating the 1D analog signal from the 1D analog acquisition unit 512 from 2D analog signal from 2D analog acquisition unit 511.

As shown in FIG. 6C, selecting mechanism 58" can be electrically connected between analog acquisition device 51 and pixel processing unit 54 being embedded into image acquisition control 55 to form a new F block 59.

Figure 6D:
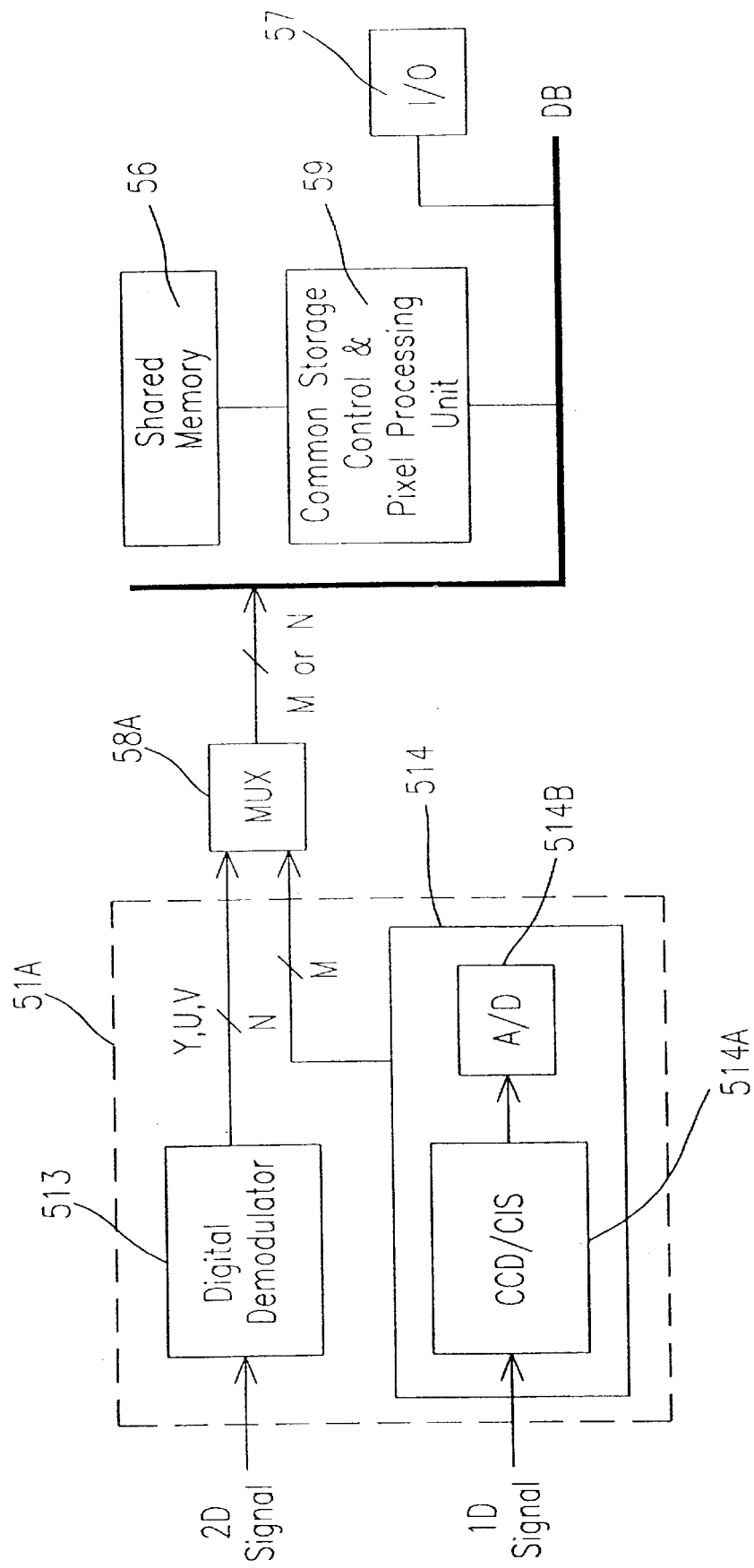
FIG. 6D is a schematical view showing an embodiment of the third preferred embodiment of an image acquiring apparatus according to the present invention capable of simultaneously or optionally acquiring image signals from 1D image source and/or 2D image source.

As shown in FIG. 6B, the present image acquiring apparatus can further include another pixel processing unit 54 so that pixel processing units 54 will respectively process the 1D analog signal from 1D signal source 53 and the 2D analog signal from 2D signal source 52. Alternatively, pixel processing units 54 can be combinedly used for serially processing one of the 1D analog signal and the 2D analog signal. A FIGS. 6A~6C respectively show the acquisition device 51 of the present image acquiring apparatus in analog versions. It can be readily known by one skilled in the art that the acquisition device can alternatively be in the digital version. As shown in FIG. 6D, a digital I acquisition device 51A for the image acquiring apparatus according to the present invention can include a digital demodulator or demodulating integrated circuit 513 for the 2D signal, and an image digitizer 514 for the 1D signal. Image digitizer 514 includes a CCD (or CIS) 514A and an analog-to-digital converter (signal digitizer) 514B. The 1D digital image signal and the 2D digital image signal are controlled by a multiplexer 58A to be sent to the data bus DB.

Figure 7A:
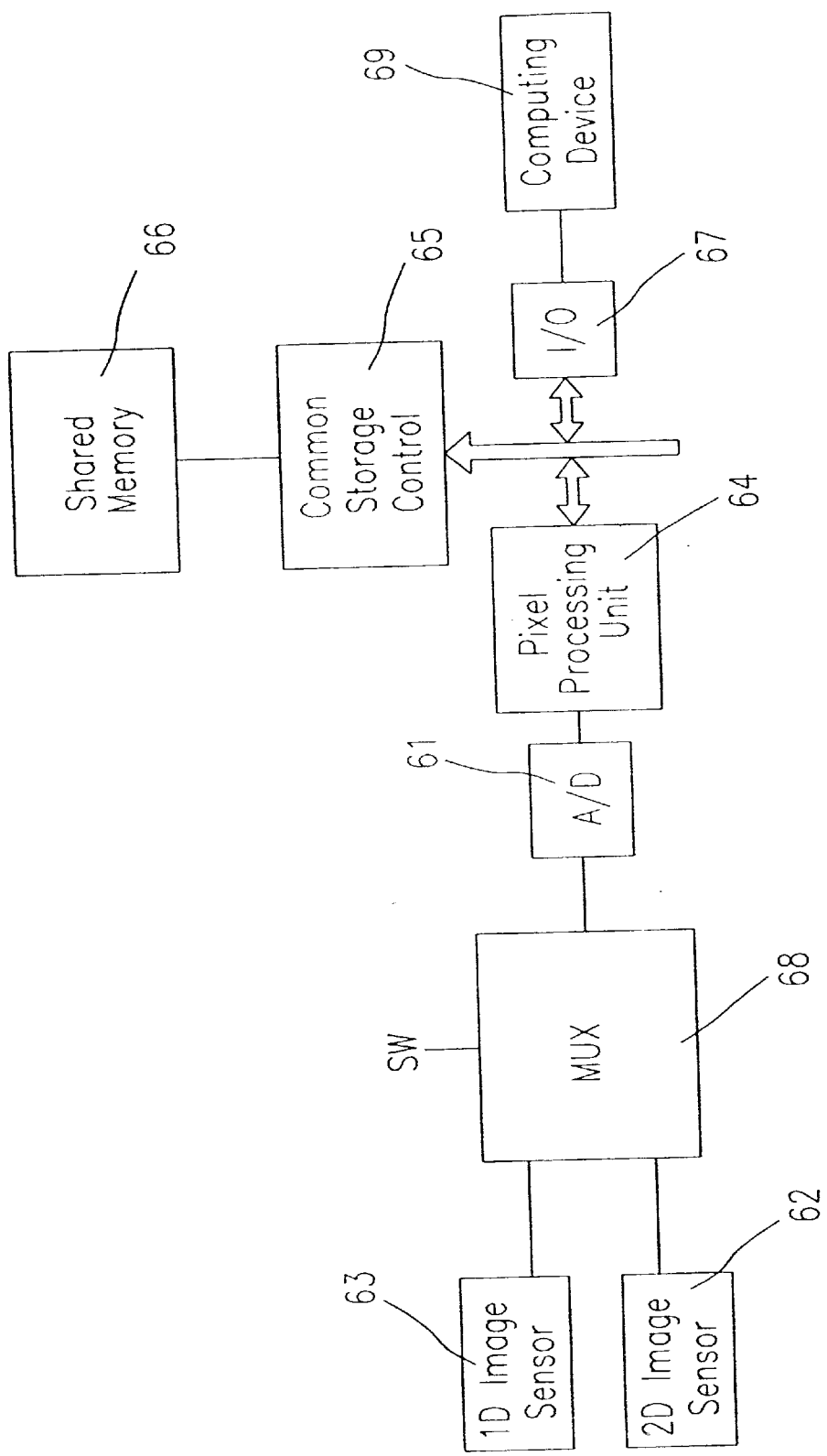
FIG. 7A is a schematical view showing a first preferred block diagram of implementing an image acquiring apparatus according to the present invention.
Figure 7B:
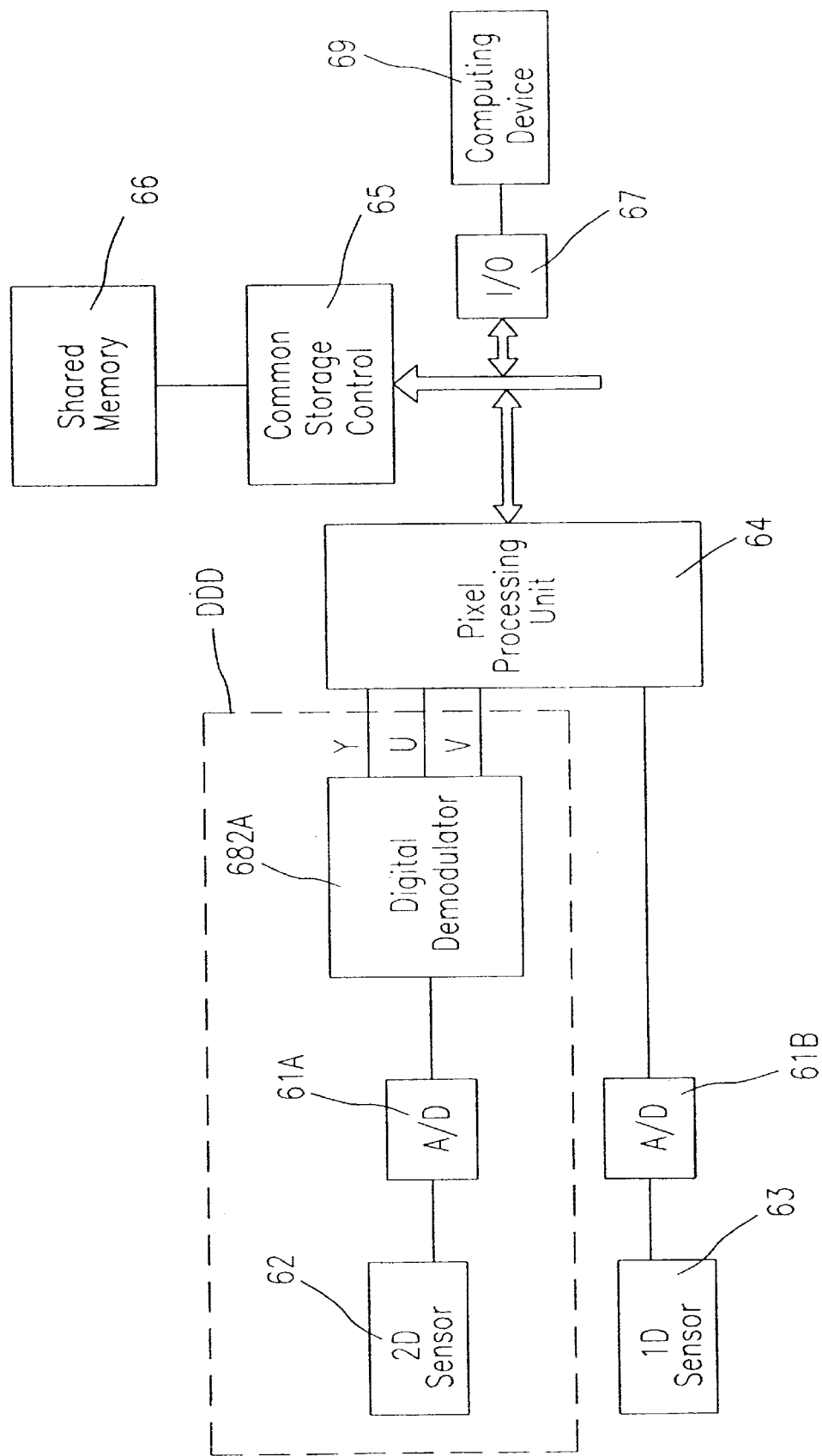
FIG. 7B is a schematical view showing a second preferred block diagram of implementing an image acquiring apparatus according to the present invention.

A first preferred block diagram for implementing the image acquiring apparatus according to the present invention is shown in FIG. 7A which illustrates that the 1D signal from the 1D sensor 63 or the 2D signal from the 2D sensor 62 will pass through a selecting mechanism 68 being a multiplexer controlled by a software (SW). Thereafter, the selected signal is to be digitalized in the analog-to-digital converter 61 for digitalizing one of the 1D analog signal and the 2D analog signal. The digitalized image signal is to be processed by a pixel processing unit 64 electrically connected for processing one of the 1D analog signal and the 2D analog signal. An image acquisition control 65 is electrically connected to and controls pixel processing unit 64 to selectably process one of the 1D analog signal and the 2D analog signal. A memory or shared storage 66 is electrically connected to image acquisition control 65 for storage. An input/output interface 67 is electrically connected to image acquisition control 65 for being connected to, e.g. a computing device 69.

Alternatively, as shown in FIG. 71B which is slightly diversified from what is shown in FIG. 7A, before the digital signal is to be processed by pixel processing unit 64, the 1D signal first passes through an analog-to-digital converter 61B and the 2D signal first passes through an analog-to-digital converter 61A and then a digital demodulator 682A. 2D sensor 62, analog-to-digital converter 61A and digital demodulator 682A can be integrated into a digital demodulating device (DDD) chip.

Figure 7C:
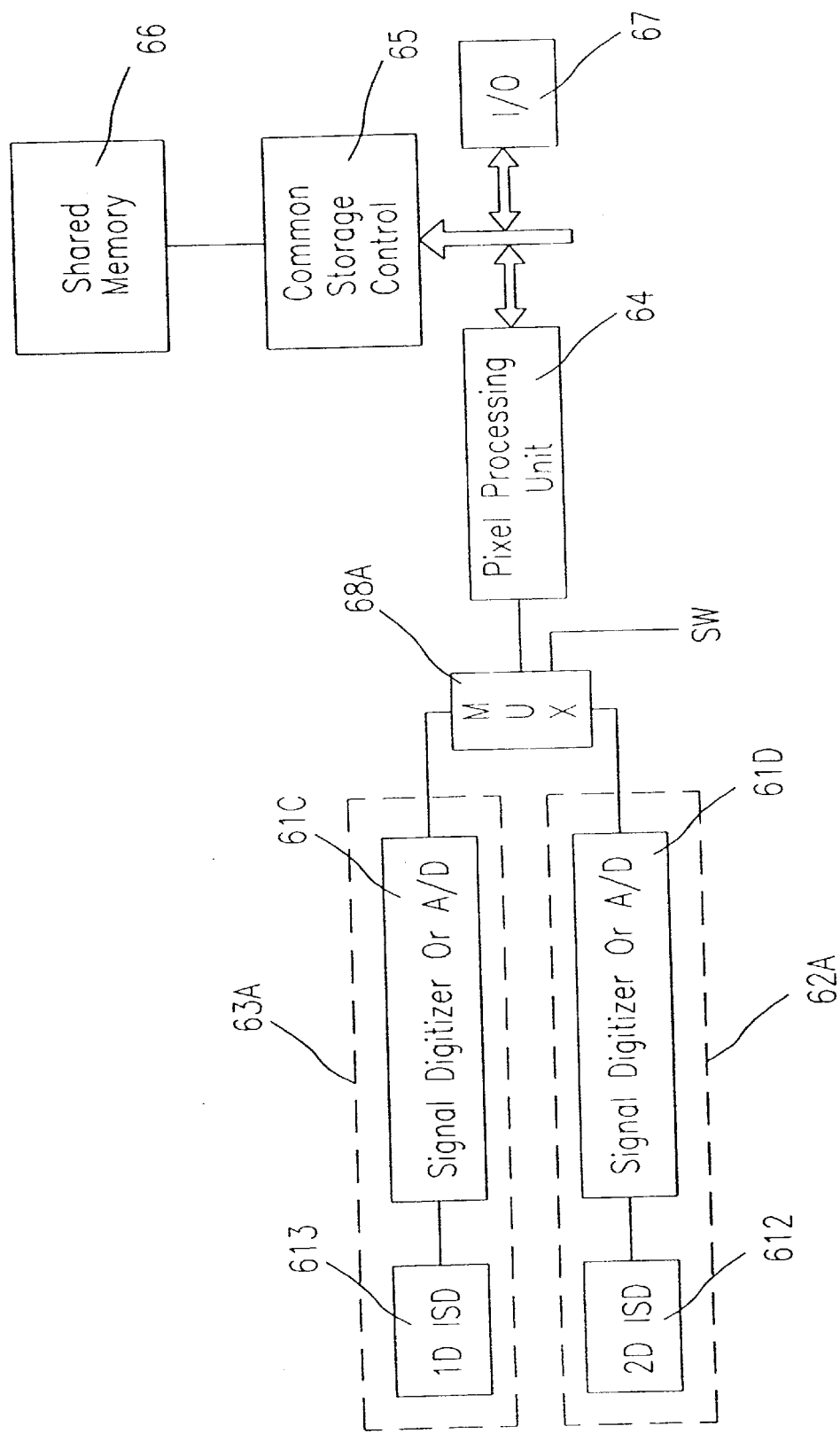
FIG. 7C is a schematical view showing a third preferred block diagram of implementing an image acquiring apparatus according to the present invention.

As shown in FIG. 7C, the present image acquiring apparatus can alternatively include a first image means 62A and a second image means 63A where first image means 63A includes a 1D image sensing device (ISD) 613, e.g. a CCD (charge coupled device), a CMOS (complementary metal-oxide-semiconductor) or a CIS (contact image sensing) linear sensors arrays, and a first signal digitizer or analog-to-digital converter 61D, and second image means 62A includes a 2D image sensing device 612, e.g. 2D CCD or CMOS sensors, and a second signal digitizer or analog-to-digital converter 61C. Converters 61C & 61D respectively digitalize the 1D analog signal and the 2D analog signal. The selecting mechanism 68A being a multiplexer is provided between the image means 63 (62) and the pixel processing unit.

Figure 7D:
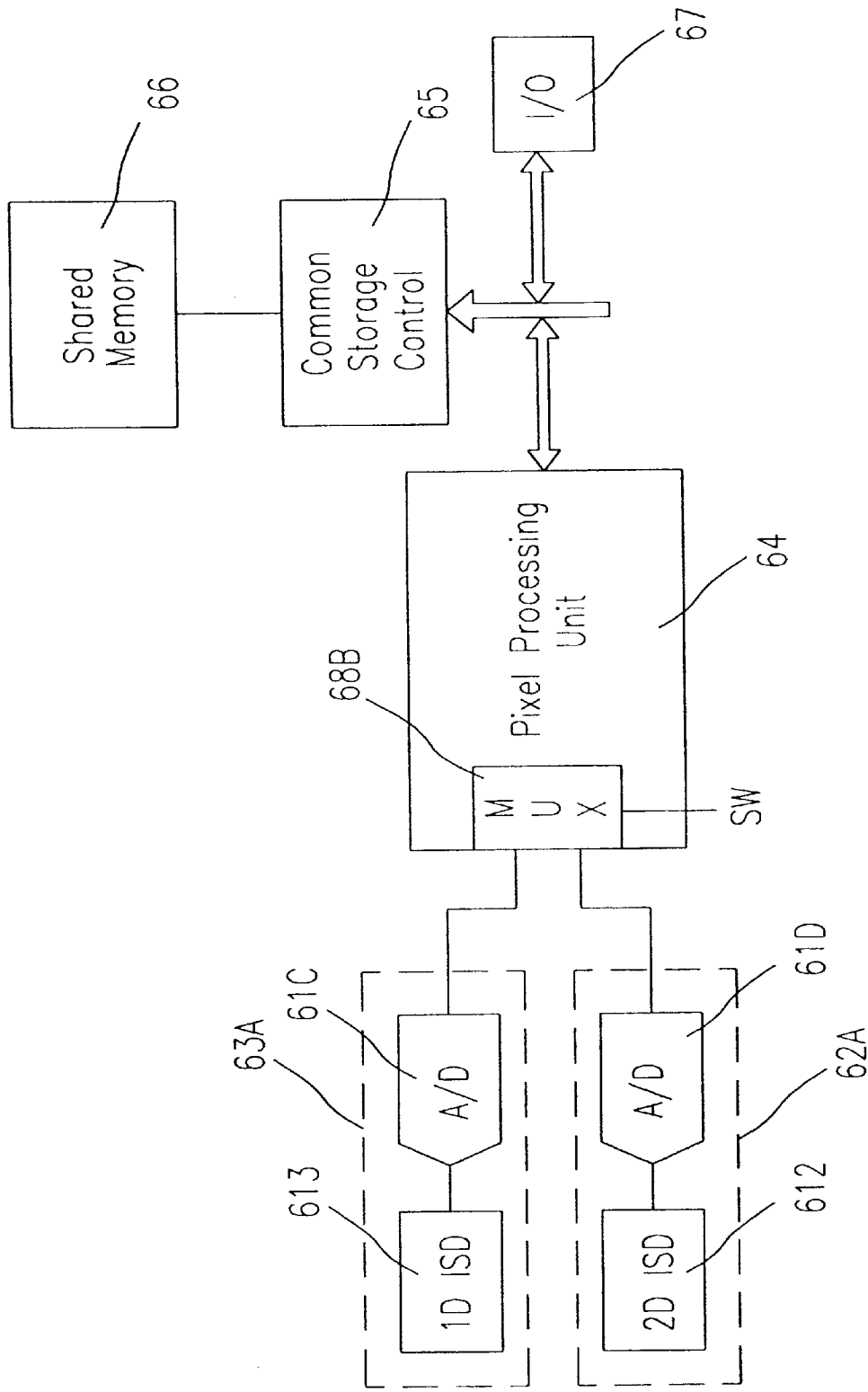
FIG. 7D is a schematical view showing a fourth preferred block diagram of implementing an image acquiring apparatus according to the present invention.

As described previously, the selecting mechanism can alternatively a switch means 68B controlled by a software which is embedded into, as shown in FIG. 7D, the pixel processing unit 64 the number of which can be larger than 1 as will be described with reference to FIG. 7E.

Figure 7E:
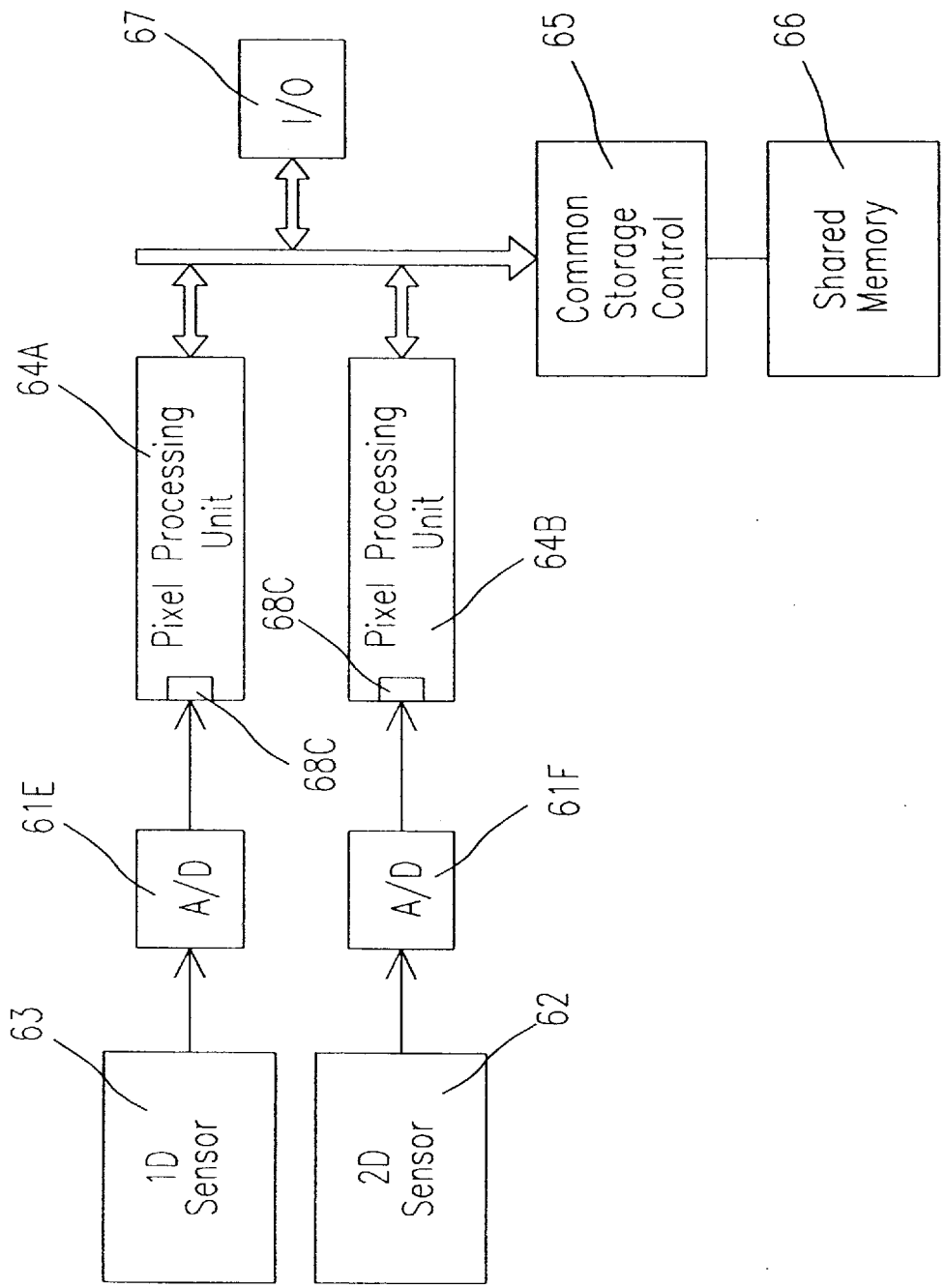
FIG. 7E is a schematical view showing a fifth preferred block diagram of implementing an image acquiring apparatus according to the present invention.

As a further embodiment as shown in FIG. 7E showing another preferred block diagram for implementing the image acquiring apparatus according to the present invention which illustrates that the 1D signal from the 1D sensor 63 and the 2D signal from the 2D sensor 62 will respectively pass through analog-to-digital converte 61E & 61F to two interactive selecting mechanisms 68C respectively built in two pixel processing units 64A & 64B so that only one of pixel processing units 64A & 64B will communicate with the bus at a time. Certainly, an output enabling or disabling signal in each pixel processing unit 64A (64B) can be used so that the selecting mechanisms 68C can be dispensed with.

Figure 8:
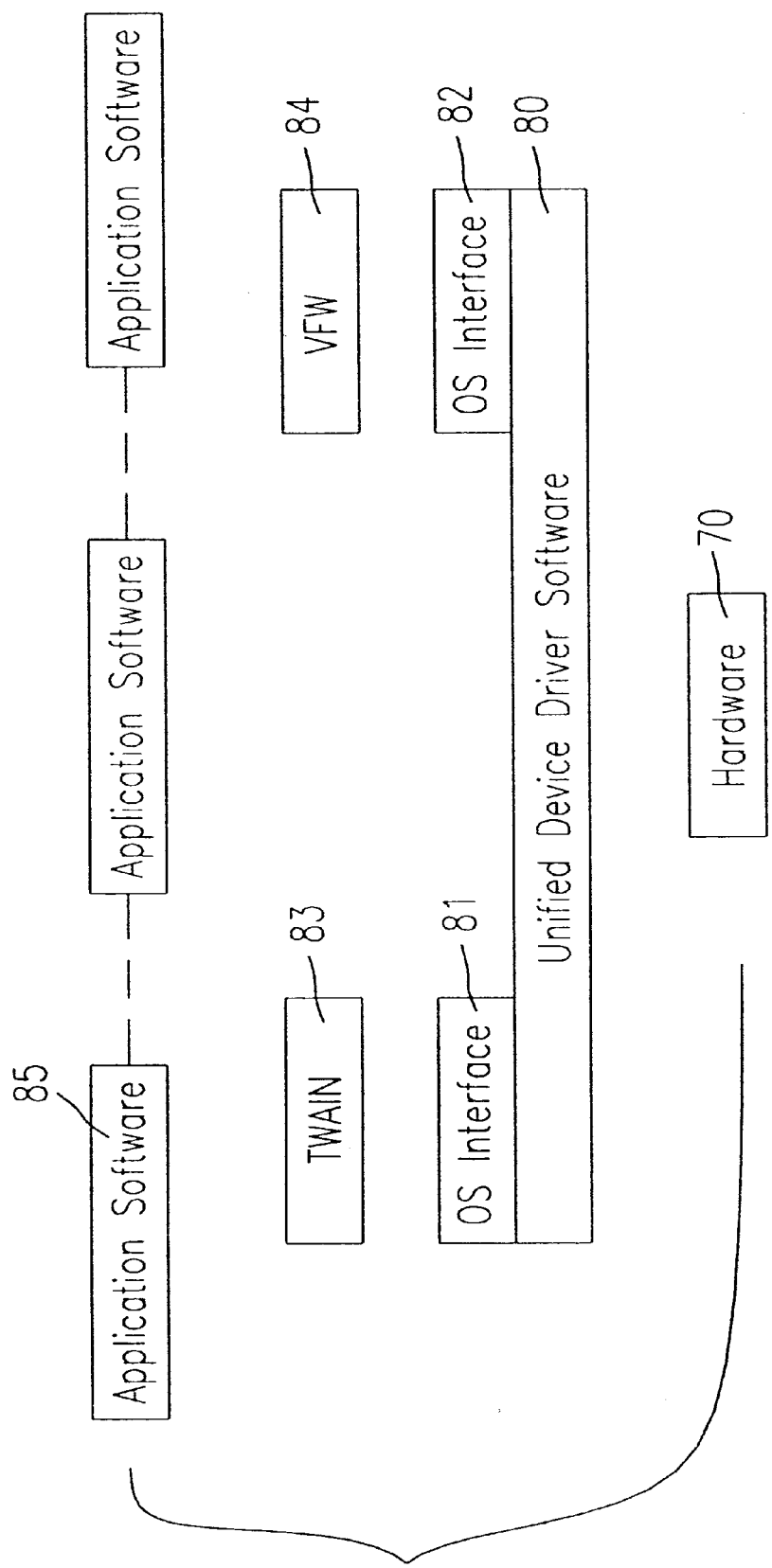
FIG. 8 is a schematical view showing a basic structure according to the present invention art if a user wants to utilize simultaneously or optionally 1D image source and 2D image source.

As shown in FIG. 8, there is shown a basic structure for an image acquiring apparatus according to the present invention which includes a hardware structure 70 for acquiring theretrough one of a 1D analog signal from a 1D signal source and a 2D analog signal from a 2D signal source, and a singular driver module 80 enabling hardware structure 70 to selectably acquire therethrough the desired one analog signal. Specifically, hardware structure 70 can include an analog signal acquisition device (51) selectably acquiring theretrough the 1D analog signal from the 1D signal source (53) and the 2D analog signal from the 2D signal source (52), a pixel processing unit (54) electrically connected to the analog signal acquisition device (51) for processing one of the 1D analog signal and the 2D analog signal, an image acquisition control (55) electrically connected to and controlling the pixel processing unit (54) to selectably process one of the 1D analog signal and the 2D analog signal, a memory or shared storage (56) electrically connected to the image acquisition control (55) for storage, an input/output interface (57) electrically connected to the image acquisition control (55), and a selecting mechanism (58) electrically connected to the analog signal acquisition device (51) for ascertaining and then passing therethrough one of the 1D analog signal and the 2D analog signal. Certainly, the selecting mechanism (58) can alternatively be embedded into driver module 80.

Structuring differently, the hardware structure 70 can include an analog signal acquisition device (51) selectably acquiring therehrough a 1D analog signal from a 1D signal source and a 2D analog signal from a 2D signal source, an image acquisition control (55) electrically connected to and controlling the analog signal acquisition device (51) to selectably acquire one of the 1D analog signal and the 2D analog signal, a memory (56) electrically connected to the image acquisition control (55) for storage, a pixel processing unit (54) electrical connected to the image acquisition control (55) for processing one of the 1D analog signal and the 2D analog signal, an input/output interface (57) electrically connected to the image acquisition control (55), and a selecting mechanism (58') electrically connected to the analog signal acquisition device (51) for ascertaining and then passing therethrough one of the 1D analog signal and the 2D analog signal. By the same token, the selecting mechanism (58') can alternatively be embedded into driver module 80.

to Device driver software or module 80 can be used to select the image acquisition mode, can utilize a common application interface definition to transfer data with hardware structure 70, and can handle the data transfer in the same manner for multiple signal types. Device driver software or module 80 can further include an operating system interface means for cooperating with a TWAIN standard interface 83, a Still-Image-Architecture (Mocrosoft ™) interface and a Video for Windows (Microsoft ™) interface 84 or other image transfer formats. The operating system interface means can include two operating system interfaces 81, 82, one of which 81 cooperates with TWAIN interface 83 and the other of which 82 cooperates with Still-Image-Architecture interface or Video for Windows interface 84 to be finally processed by at least one application software 85.

Figure 9:
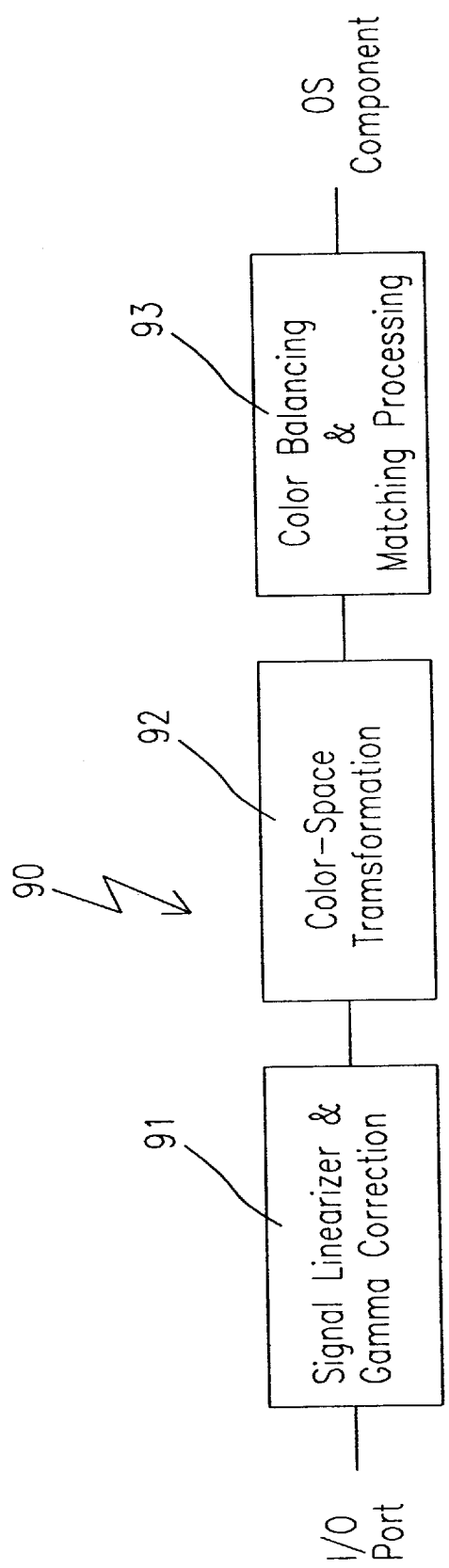
FIG. 9 schematically illustrates the operation of the common image processing and color calibration pipeline according to the present invention.

As shown in FIG. 9, the computing device 60 (69) electrically connected to input/output interface (57) can further include a common color pipeline module 90 for performing color balance calibration to generate a specific image file format regardless of the image signal input type. Common color pipeline module 90 can include a null operation, and can perform one or more functions of signal linearization and gamma correction 91, color-space transformation 92, color balancing and matching processing work 93.

Alternatively, the common color pipeline module 90 for performing color balance calibration to generate a specific image file format can be embedded into the pixel processing unit (54) rather than the computing device 60 (69).

While the invention has been described in terms of what are E presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. An image acquiring apparatus comprising:
   an image signal acquisition device selectably acquiring theretrough a 1D image signal and a 2D image signal;
   an image acquisition control electrically connected to and controlling said image signal acquisition device to selectably acquire one of said 1D signal and said 2D signal;
   a memory electrically connected to said image acquisition control for storage;
   a pixel processing unit electrically connected to said image acquisition control for processing one of said 1D image signal and said 2D image signal;
   an input/output interface electrically connected to said image acquisition control; and
   a selecting mechanism electrically connected to said signal acquisition device for passing one of said 1D image signal and said 2D image signal through said pixel processing unit.

2. An apparatus according to claim 1 wherein said image acquisition device includes:
   a 1D analog acquisition unit for acquiring therethrough said 1D image signal; and
   a 2D analog acquisition unit for acquiring therethrough said 2D image signal.

3. An apparatus according to claim 2 wherein said 1D analog acquisition unit and said 2D analog acquisition unit are respectively a 1D image sensor and a 2D image sensor.

4. An apparatus according to claim 1 wherein said image acquisition device includes:
   a 1D image digitizer for acquiring theretrough said 1D image signal; and
   a 2D digital demodulating device for acquiring therethrough said 2D image signal.

5. An apparatus according to claim 4 wherein said 2D digital demodulating device includes a 2D sensor, an analog-to-digital converter and a digital demodulator.

6. An apparatus according to claim 1 wherein said image acquisition device includes:
   a 1D image means for acquiring therethrough said 1D image signal; and
   a 2D image means for acquiring therethrough said 2D image signal.

7. An apparatus according to claim 6 wherein each of said 1D image means and 2D image means includes an image sensing device and a signal digitizer.

8. An apparatus according to claim 7 wherein said signal digitizer is an analog-to-digital converter.

9. An apparatus according to claim 6 wherein each of said 1D image means and said 2D image means is an image sensor.

10. An apparatus according to claim 9 wherein said image sensor incorporates therein an image digitizer.

11. An apparatus according to claim 10 wherein said image digitizer is an analog-to-digital converter.

12. An apparatus according to claim 1 wherein said selecting mechanism is electrically connected to said pixel processing unit.

13. An apparatus according to claim 1 wherein said selecting mechanism is selecting switch controlled by a software built in said pixel processing unit.

14. An apparatus according to claim 13 wherein said selecting mechanism is a multiplexer.

15. An apparatus according to claim 1 wherein said selecting mechanism is built in said image acquisition device for discriminating said 1D image signal from from said 2D image signal.

16. An apparatus according to claim 1 wherein said selecting mechanism is electrically connected between said image acquisition device and said pixel processing unit.

17. An apparatus according to claim 1 wherein said selecting mechanism includes analog demodulating circuit and a multiplexer.

18. An apparatus according to claim 1 wherein said pixel processing unit is embedded into said image acquisition control.

19. An apparatus according to claim 1, further comprising another pixel processing unit so that said pixel processing units will respectively process said 1D image signal and said 2D image signal.

20. An apparatus according to claim 19, further comprising another selecting mechanism, said two selecting mechanisms being interactive such that only one of said 1D image signal and said 2D image signal will pass trough a respective one of said pixel processing units at a time.

21. An apparatus according to claim 1, further comprising at least another pixel processing unit for serially processing one of said 1D image signal and said 2D image signal.

22. An apparatus according to claim 1 wherein said image acquisition device includes an analog-to-digital converter for digitizing one of said 1D image signal and said 2D image signal.

23. An apparatus according to claim 1 wherein said image acquisition device includes two analog-to-digital converters for respectively digitizing said 1D image signal and said 2D image signal.

24. An apparatus according to claim 1 wherein said pixel processing unit firer includes a common color pipeline module for performing color balance calibration to generate a specific image file format.

25. An apparatus according to claim 24 wherein said common color pipeline module includes a null operation.

26. An apparatus according to claim 24 wherein said common color pipeline module performs at least one function selected from a group consisting of signal linearization, gamma correction, color-space transformation, color balancing and matching processing.

27. An apparatus according to claim 1, further comprising a computing device electrically connected to said input/output interface and provided with a common color pipeline module for performing color balance calibration to generate a specific image file format.

28. An apparatus according to claim 27 wherein said common color pipeline module includes a null operation.

29. An apparatus according to claim 27 wherein said common color pipeline module performs at least one function selected from a group consisting of signal linearization, gamma correction, color-space transformation, color balancing and matching processing.

30. An image acquiring apparatus comprising:
   an image signal acquisition device selectably acquiring therethrough a 1D image signal and a 2D image signal;
   a pixel processing unit electrically connected to said image signal acquisition device for processing one of said 1D image signal and said 2D image signal,
   an image acquisition control electrically connected to and controlling said pixel processing unit to selectably process one of said 1D image signal and said 2D image signal,
   a memory electrically connected to said image acquisition control for storage;
   an input/output interface electrically connected to said image acquisition control; and
   a selecting mechanism electrically connected to said image signal acquisition device for passing one of said 1D image signal and said 2D image signal through said pixel processing unit.

31. An apparatus according to claim 30 wherein said image acquisition device includes:
   a 1D analog acquisition unit for acquiring therethrough said 1D image signal; and
   a 2D analog acquisition unit for acquiring theretrough said 2D image signal.

32. An apparatus according to claim 30 wherein said image acquisition device includes:
   a 1D image digitizer for acquiring therethrough said 1D image signal; and
   a 2D digital demodulating device for acquiring therethrough said 2D image signal.

33. An apparatus according to claim 30 wherein said image acquisition device includes:
   a 1D image means for acquiring therethtrough said 1D image signal; and
   a 2D image means for acquiring theretrough said 2D image signal.

34. An apparatus according to claim 33 wherein each of said 1D image means and 2D image means includes an image sensing device and a signal digitizer.

35. An apparatus according to claim 33 wherein each of said 1D image means and 2D image means is an image sensor.

36. An image acquiring apparatus comprising:
   a hardware structure for acquiring therethrough one of a 1D image signal and a 2D image signal; and
   a singular driver module enabling said hardware structure to selectably acquire therethrough said one image signal,
   wherein said hardware structure comprises:
      an image signal acquisition device selectably acquiring therethrough a 1D image signal and a 2D image signal;
      a pixel processing unit electrically connected to said image acquisition device for processing one of said 1D image signal and said 2D image signal;
      an image acquisition control electrically connected to and controlling said pixel processing unit to selectably process one of said 1D image signal and said 2D image signal;
      a memory electrically connected to said image acquisition control for storage;
      an input/output interface electrically connected to said image acquisition control; and
      a selecting mechanism electrically connected to said image signal acquisition device for passing one of said 1D image signal and said 2D image signal through said pixel processing unit.

37. An apparatus according to claim 36, further comprising an operating system interface means for cooperating with a TWAIN standard interface, a Still-Image-Architecture (Microsoft ™) interface and a Video for Windows (Microsoft ™) interface.

38. An apparatus according to claim 37 wherein said operating system interface means includes two operating system interfaces, one of which cooperates with said TWAIN interface and the other of which cooperates with one of said Still-Image-Architecture interface and said Video for Windows interface.

39. An apparatus according to claim 36 wherein said selecting mechanism is embedded into said driver module.

40. An image acquiring apparatus comprising:

a hardware structure for acquiring therethrough one of a 1D image signal and a 2D image signal; and a singular driver module enabling said hardware structure to selectably acquire therethrough said one image signal;

wherein said hardware structure comprises:

an image signal acquisition device selectably acquiring therethrough a 1D image signal and a 2D image signal;

an image acquisition control electrically connected to and controlling said image signal acquisition device to selectably acquire one of said 1D image signal and said 2D image signal;

a memory electrically connected to said image acquisition control for storage;

a pixel processing unit electrically connected to said image acquisition control for processing one of said 1D image signal and said 2D image signal;

an input/output interface electrically connected to said image acquisition control; and a selecting mechanism electrically connected to said image signal acquisition device for passing one of said 1D image signal and said 2D image signal through said pixel processing unit.

41. An apparatus according to claim 40 wherein said selecting mechanism is embedded into said driver module.

42. An apparatus according to claim 40 wherein said image acquisition device includes:

a 1D analog acquisition unit for acquiring therethrough said 1D image signal; and a 2D analog acquisition unit for acquiring therethrough said 2D image signal.

43. An apparatus according to claim 40 wherein said image acquisition device includes:

a 1D image digitizer for acquiring therethrough said 1D image signal; and a 2D digital demodulating device for acquiring therethrough said 2D image signal.

44. An apparatus according to claim 40 wherein said image acquisition device includes:

a 1D image means for acquiring therethrough said 1D image signal; and a 2D image means for acquiring theretrough said 2D image signal.

45. An apparatus according to claim 44 wherein each of said 1D image means and 2D image means includes an image sensing device and a signal digitizer.

46. An apparatus according to claim 44 wherein each of said 1D image means and 2D image means is an image sensor.

47. An apparatus according to claim 46 wherein said image sensor incorporates therein a signal digitizer.

48. An apparatus according to claim 40 wherein said driver module utilizes a common application interface definition to transfer data with said hardware structure.

49. An image acquiring apparatus comprising:

a hardware structure for acquiring therethrough one of a 1D image signal and a 2D image signal;

a singular driver module enabling said hardware structure to selectably acquire therethrough said one image signal; and an operating system interface means for cooperating with a TWAIN standard interface, a Still-Image-Architecture (Microsoft ™) interface and a Video for Windows (Microsoft ™) interface.

* * * * *